United States Patent [19]

Doyel

[11] 4,154,251

[45] May 15, 1979

[54] SMOKE DISPERSAL DEVICE

[76] Inventor: John S. Doyel, 404 W. 20th St., New York, N.Y. 10011

[21] Appl. No.: 905,432

[22] Filed: May 12, 1978

Related U.S. Application Data

[63] Continuation-in-part of Ser. No. 748,751, Dec. 8, 1976, abandoned.

[51] Int. Cl.² .................. B01D 50/00; A24D 1/12
[52] U.S. Cl. .......................... 131/231; 55/385 G; 55/279; 55/467; 422/124
[58] Field of Search .............. 55/385 G, 279, 467, 55/270; 131/231; 422/124; 15/327 D

[56] References Cited

U.S. PATENT DOCUMENTS

| | | | |
|---|---|---|---|
| 2,029,192 | 1/1936 | Ray | 55/385 G |
| 2,747,101 | 5/1956 | Hammond, Jr. | 55/385 G |
| 2,788,085 | 4/1957 | Waller | 55/385 G |
| 3,362,416 | 1/1968 | Jackson | 55/385 G |
| 3,516,232 | 6/1970 | Gilbertson | 55/385 G |
| 3,797,205 | 3/1974 | Weisskopf | 55/385 G |
| 3,807,148 | 4/1974 | Fike et al. | 55/385 G |
| 3,958,965 | 5/1976 | Raczkowski | 55/385 G |
| 4,043,776 | 8/1977 | Orel | 55/385 G |

Primary Examiner—Bernard Nozick

[57] ABSTRACT

The device draws the smoke up from lit cigarettes and the like and disperses it thoroughly in large amounts of air to make it nearly invisible and less offensive. A battery operated motor drives an impeller which draws smoke through a ram tube. The smoke then proceeds through an annular flow channel and passes through a perforated dispersal ring before being ejected through a dispersal rim slot near the top of the device. The flow path is arranged to minimize the drain on the batteries and maximize dispersal; the motor, its batteries and electrical circuit connectors (including a novel electrical switch) are arranged such that smoke and ashes are kept away from their compartment. The entire device disassembles easily for cleaning. In one embodiment, the smoke passes through an ash screen having a low resistance to air flow. In another, there is no screen or filter at all, but the smoke may pass along (not through) an absorbant material which may be saturated or otherwise provided with chemicals which reduce the amount of harmful ingredients in the smoke and/or deodorize the smoke. Additional containers of such chemicals may be provided in the device.

12 Claims, 13 Drawing Figures

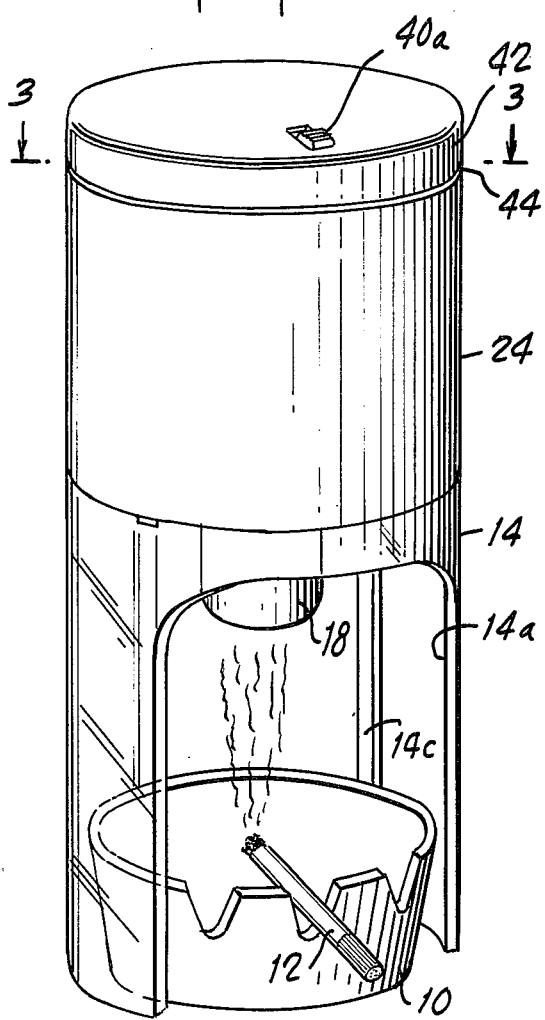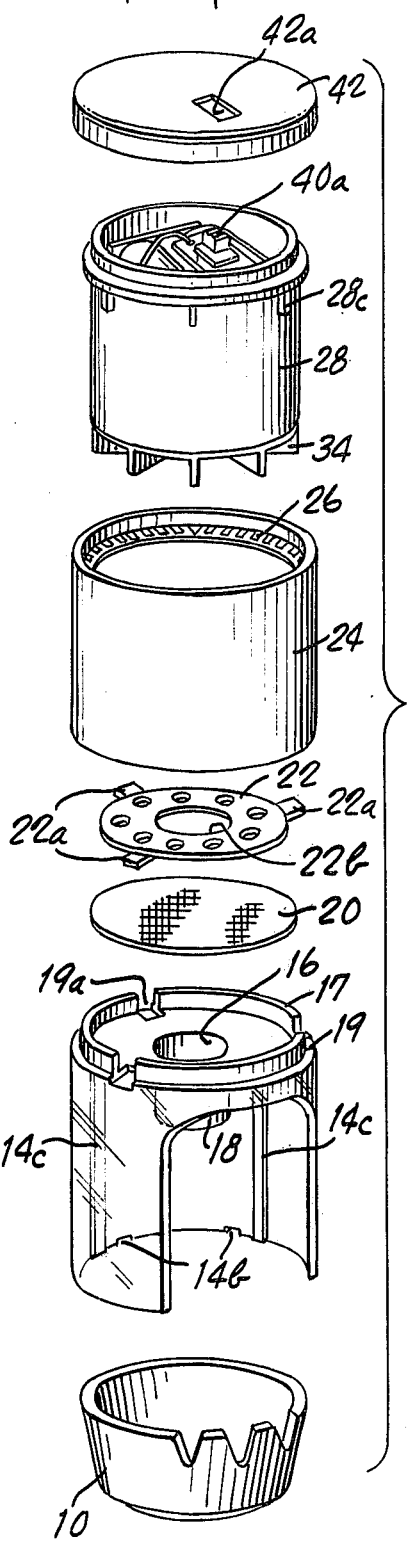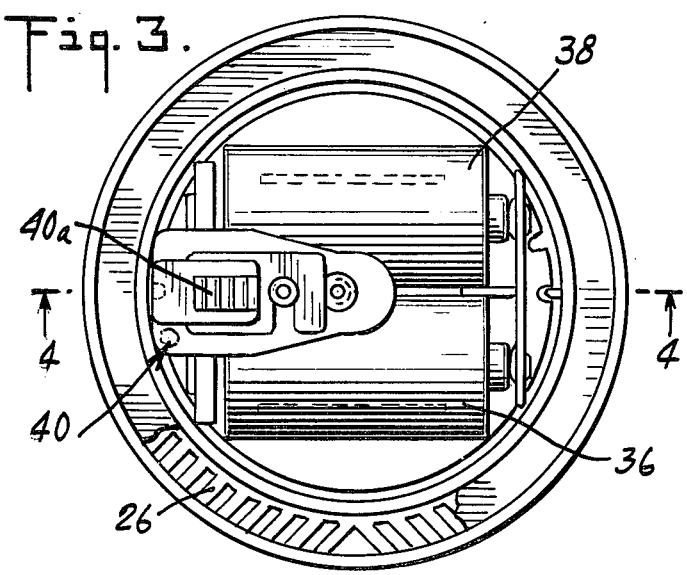

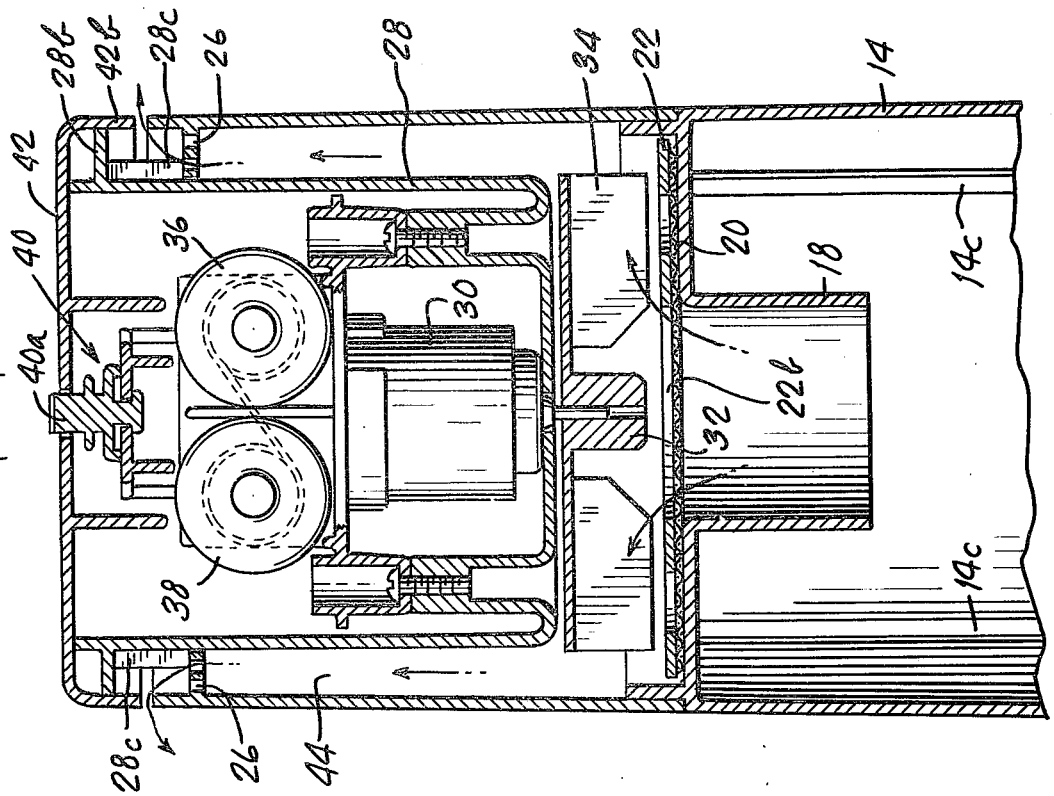
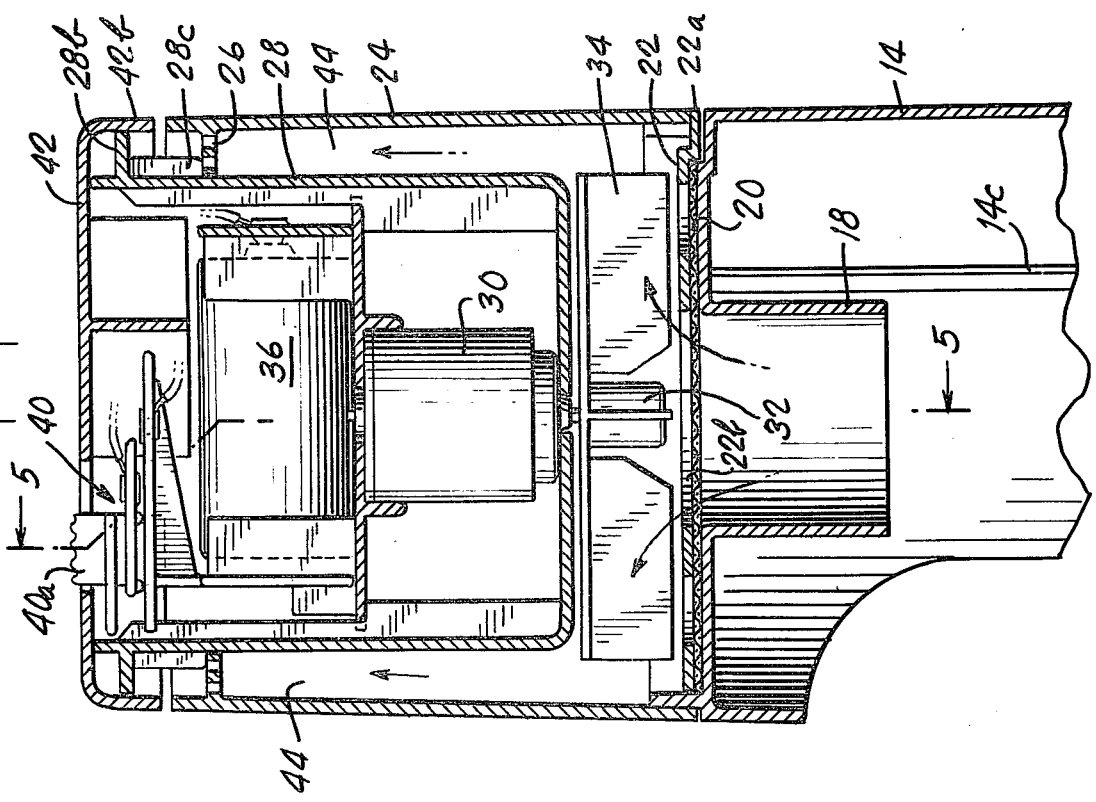

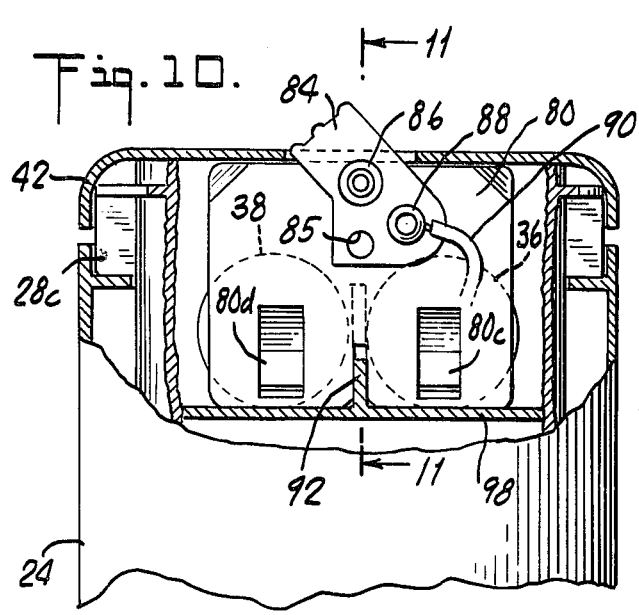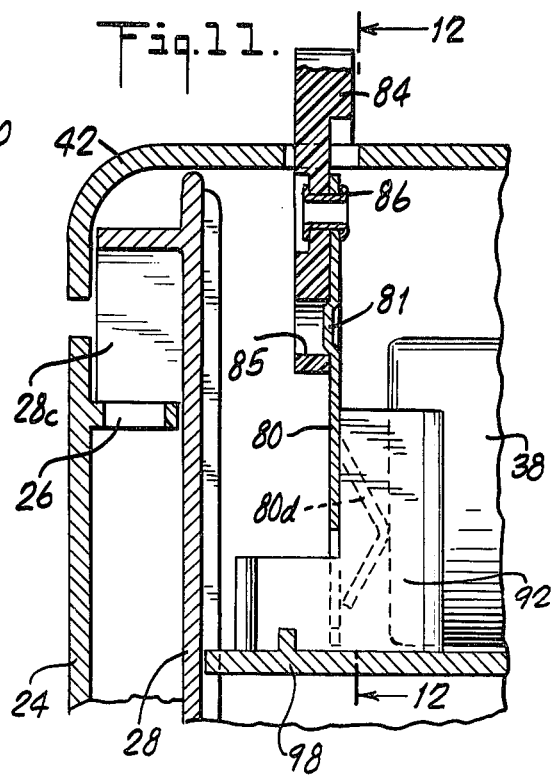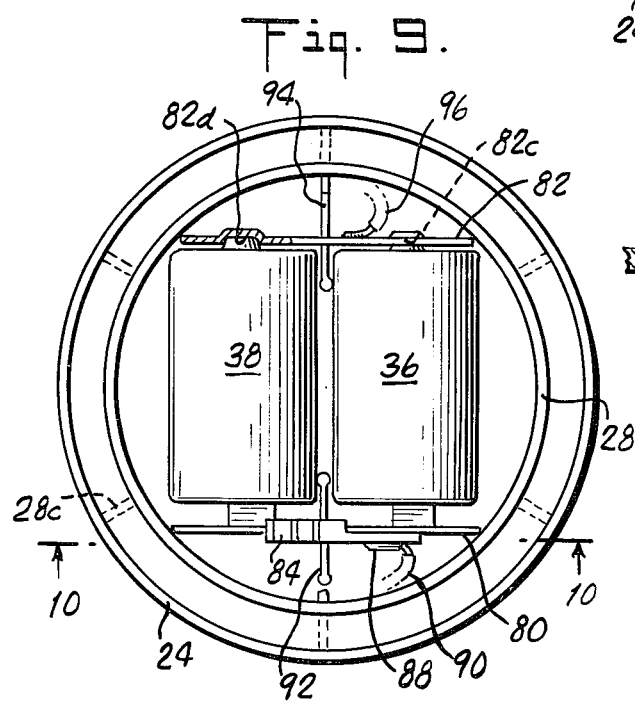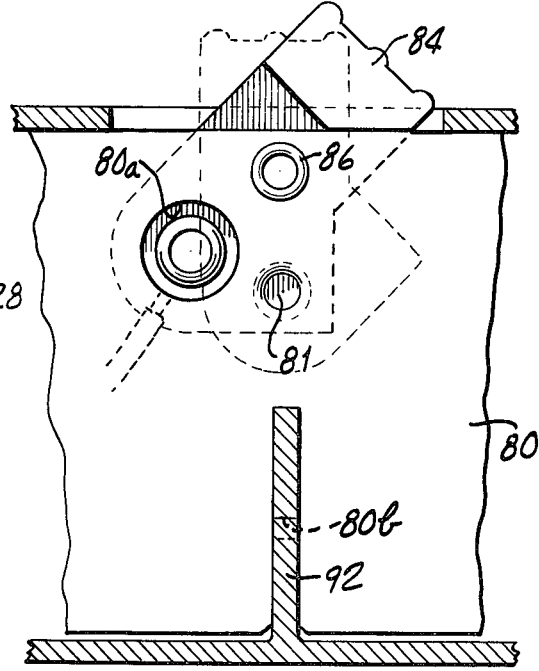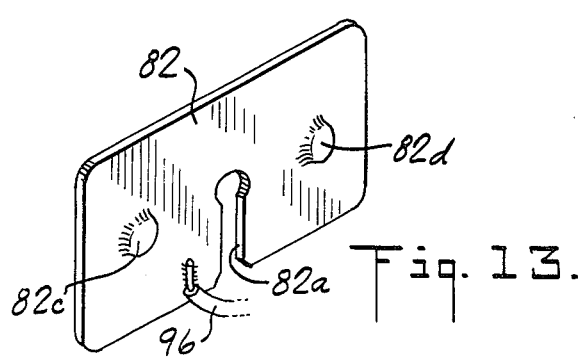

SMOKE DISPERSAL DEVICE

REFERENCE RELATED APPLICATION

This application is a continuation-in-part of patent application Ser. No. 748,751 filed Dec. 8, 1976 now abandoned, which is hereby incorporated by reference.

BACKGROUND AND SUMMARY OF THE INVENTION

The concentrated smoke issuing directly from a lit smoking article such as a cigarette is thought by at least some people to be more objectionable than smoke which has been dispersed in a large amount of air, and there have been many devices in the prior art which have attempted to filter such smoke issuing directly from a lighted smoking articles and have, in the process, dispersed the smoke as well. Some examples of such devices are shown in U.S. Pat. No. 3,516,232 and involve creating an airflow from a lit cigarette in an ashtray through a filter such as a charcoal filter by an impeller, or by a smokestack effect created by an electric bulb at the base of a chimney-like tube. Other examples of devices of this type are shown in U.S. Pat. Nos. 3,807,148 and 3,797,205, and another device of this type is shown in U.S. Pat. No. 4,043,776. There are many other devices which primarily, or incidentally, filter or break up the smoke issuing directly from lit smoking articles, and some are illustrated in the following U.S. Pat. Nos. 2,013,498; 2,029,192; 2,747,101; 2,788,085; and 3,362,416.

One of the desirable characteristics of devices of this type is portability so they can be readily moved from place to place, as the conventional ashtray is typically moved. Many of the known prior art devices of this type do not have this desirable characteristic and require electrical connection to a wall outlet or are large in size, making them inconvenient to so move from place to place. As to the known prior art devices which are battery powered, a major desirable characteristic of these devices is efficiency of operation so that battery power can be conserved and useful life prolonged. It is believed that many of the battery operated prior art devices of this type use filtering arrangements that require substantial power and therefor substantial battery drain to force an airflow through the filter, while others are believed to have less than optimal flow arrangements. It is believed therefor that there is a need for a smoke dispersal device which is highly portable, so that it can be conveniently moved from place to place, as a regular ashtray is normally moved by a smoker, and which additionally has a highly efficient air or fluid flow so that the battery drain is relatively low, but which at the same time effectively disperses the smoke so as to reduce objectionable concentration thereof. The invention here is directed to satisfying this need, and is additionally directed to a device of this type which can be conveniently disassembled for cleaning.

The invented smoke dispersal device is battery operated. It includes an ashtray and a hollow accumulator tube open at the bottom and registering with the ashtray to receive smoke rising from a lit smoking article in the ashtray. The accumulator tube has air inlet means comprising at least one cutout (and typically one large and two small cutouts) in its sidewall so as to take in air to be mixed with the smoke from the smoking article. Additionally, the accumulator tube has a top opening, and a ram tube extends from that top opening downwardly into its hollow interior. A hollow main body tube is disposed over the accumulator tube and the ram tube. A tubular motor housing is placed within the main body tube but is spaced inwardly from its sidewall so as to leave an annular flow channel between the sidewall of the main body tube and the sidewall of the motor housing. The motor housing contains batteries and an electric motor which has a shaft extending downwardly through a suitable aperture at the bottom of the motor housing. The shaft carries an impeller rotatable in a space below the motor housing and above the ram tube to force a fluid flow from the interior of the accumulator tube up through the ram tube and then up through the annular channel between the main body tube and the motor housing. A top lid fits over the motor housing and the main body tube and leaves an outlet comprising a dispersal slot between the rim of the lid and the top of the sidewall of the main body tube, through which the fluid forced up by the impeller can leave the device. A perforated dispersal ring extends radially inwardly from the sidewall of the main body tube to the motor housing such that the fluid flow must go through the perforations in it. This passage through the performations make the flow turbulent (or more turbulent) and thoroughly breaks up the smoke contained in it. The rim of the top lid surrounds the sidewall of the main body tube such that the flow which proceeds up through the annular channel must be reversed in direction to exit downwardly along the exterior of the sidewall of the main body tube or radially outwardly, to be thereby further broken up and made more turbulent. The top opening of the motor housing is sealed by the top lid, which has only an opening for a switch lever for turning the motor off and on, and keeps smoke or ashes from getting into the motor housing and interfering with the operation of the motor, the batteries or the switch.

An absorber of a material similar to blotting paper may be placed along the interior cylindrical surface of the main body tube, and the absorber may be saturated or otherwise provided with a chemical which removes some of the harmful ingredients of smoke and/or deodorizes the air exiting from the device. In addition, or instead, several containers for such chemical may be formed in the device, such as at the top surface of the accumulator tube, around the ram tube. A valve ring may be used to close these containers, or to open them to the desired degree.

An ash screen having low resistance to air flow through it may, but need not, be placed over the ram tube. In fact, it has been discovered that satisfactory dispersal is achieved when no ash screen (or any filtering device) is used, and in such case the battery life can be prolonged significantly.

In operation, a lit smoking article such as a cigarette is placed on the ashtray such that the smoke from it rises within the interior of the accumulator tube, and the motor is turned on such that the impeller forces an upward fluid flow which is mainly air but contains some smoke from the smoking article and perhaps some ashes. This fluid flow proceeds up through the ram tube, where it is concentrated and speeded up, and then proceeds up through the annular channel. Before leaving the annual channel the flow passes through the perforations of the dispersal ring, and then goes further up to the lid, reverses direction, and exits downwardly between the rim of the top lid and the exterior of the sidewall of the main body tube or radially outwardly. When exiting, the mixture of air and smoke (and perhaps very small ash particles) is so mixed and broken up and so dispersed in large amounts of air that the smoke or any small ash particles are invisible or nearly so, and the smoke is difficult to smell or is at least less offensive to people bothered by direct, concentrated smoke.

The invented device is constructed such that it can be taken apart for cleaning easily, without any tools. The ashtray is friction-fitted within the accumulator tube and is easily pulled off by hand. The accumulator tube friction-fits into the main body tube and is easily pulled off by hand. When the accumulator base and the main body tube are taken apart, the valve ring can be conveniently removed, and the containers refilled. The top lid pulls off easily from its friction-fit over the top of the main body tube, and with it goes the motor housing with its contents. The motor housing can be separated from the top lid by simply pulling off the friction-fitted top lid. Then all of the parts, except the contents of the motor housing, can be washed, and even the impeller below the motor housing can be immersed in water for washing. Since the motor housing is sealed by the top lid during operation of the device, smoke and ashes are kept from getting inside it, and there is no need to wash or otherwise clean its interior. The device is assembled by hand with comparable ease.

A significant advantage of the invented device is that it does not force the smoke and air mixture through any filters but instead has a relatively unobstructed flow, with attendant low power drainage on the batteries and long battery life. Even in the embodiment which uses an ash screen, the mesh is large and the flow resistance low. In the embodiment which does not use even an ash filter, the battery life is prolonged even further. Each of the embodiments nevertheless so mixes and disperses the smoke that the smoke becomes invisible or nearly so and tends to become considerably less objectionable to people who find direct smoke objectionable.

BRIEF DESCRIPTION OF THE DRAWINGS

FIG. 1 is a front isometric view of the invented smoke dispersal device.

FIG. 2 is an exploded isometric view of the device.

FIG. 3 is a top sectional view taken along lines 3—3 of FIG. 1.

FIG. 4 is a partial sectional view of the device taken along lines 4—4 of FIG. 3.

FIG. 5 is a partial sectional view of the device taken along lines 5—5 of FIG. 3.

FIG. 9 is a top view of the device, without a top cover, showing an alternate embodiment of an electrical switch.

FIG. 10 is a partly sectional view along line 10—10 of FIG. 9 and a partly side elevational view of a top part of the device.

FIG. 11 is a partial sectional view along line 11—11 of FIG. 10.

FIG. 12 is a partial sectional view along lines 12—12 of FIG. 11.

FIG. 13 is an isometric view of a part of the electrical switch of the embodiment shown in FIGS. 9-12.

DETAILED DESCRIPTION

Figure 7:
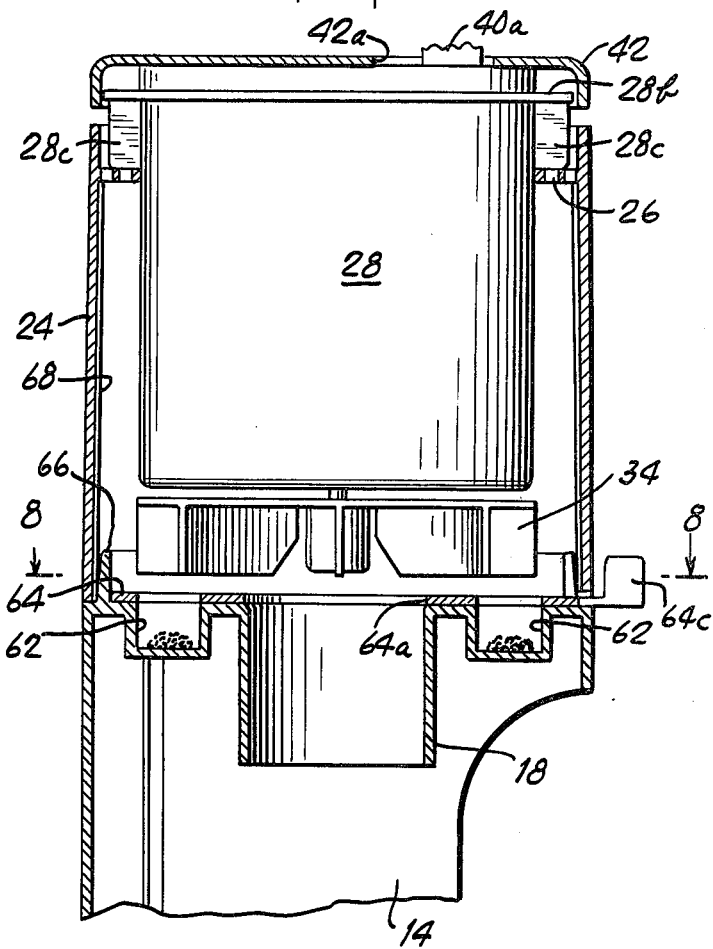
FIG. 7 is a partial sectional view of the device of FIG. 6.

Referring to FIGS. 1 and 2, the invented smoke dispersal device includes an ashtray 10 for receiving a smoking article such as a cigarette 12. The ashtray 10 is enclosed within the sidewall of the hollow accumulator tube 14, which has air inlet means comprising a large cutout 14a and preferably additional cutouts, generally of a smaller size, such as the cutouts 14b and 14c. Additionally, the tube 14 includes a pair of vertical ribs 14c extending radially inwardly from its sidewall so as to leave a narrow annular space between that sidewall and the ashtray 10. Air drawn in through the cutouts 14b and 14c can enter the tube 14 through the annular space. The accumulator tube 14 is open at the bottom and registers with the ashtray 10 so that the smoke rising from the cigarette 12 can be received within the hollow interior of the accumulator tube 14. The accumulator tube 14 has a top opening at 16, and a ram tube 18 extends downwardly from the opening 16 into the interior of the accumulator tube 14. The remainder of the top of the accumulator tube 14 is closed, so that all of the fluid flow going up from the interior of the accumulator tube 14 must go through the ram tube 18, which is open at its bottom and at its top. An ash screen 20 fits over the accumulator tube 14 and the opening 16. The ash screen 20 is within a circular ridge formed by three segmental projections 17 extending upwardly from the accumulator tube 14. The ash screen 20 may be a piece of fabric having relatively low resistence to fluid flow through it, or may be a fine wire mesh. A screen holder 22 holds the screen 20 down against the opening 16, and has three radially extending tabs 22a which fit in the corresponding spaces between the projections 17 and into corresponding notches 19a in the land 19 so as to be flush with the land 19. The screen holder 22 has a suitable central opening 22b registering with the opening 16 at the top of the accumulator tube such that the fluid flow up through the ram tube 18 can go up through the ash screen 20 and the central opening 22b in the screen holder 22. A hollow main body tube 24 has a bottom opening dimensioned for a friction fit around the projections 17 such that the bottom of the tube 24 abuts against a land 19 at the top of the tube 14 so as to substantially prevent escape of fluid flow at the fit between the tubes 14 and 24. The tabs 22a of the screen holder 22 do not extend radially outwardly of the projections 17 so that they are surrounded, like the projections 17, by the sidewall of the tube 24 when the tubes 24 and 14 are fitted with each other. The main body tube 14 has, near its upper portion, a radially inwardly extending dispersal ring 26 which has numerous perforations. A motor housing 28 fits inside the main body tube 24 such that the radially inner periphery of the dispersal ring 26 abuts or substantially abuts the radially outer periphery of the motor housing 28 (as best seen in FIG. 3), whereby an annular flow channel is left between the sidewall of the main body tube 24 and the motor housing 28, and the dispersal ring 26 allows fluid flow only through its perforations.

Referring to FIGS. 3, 4 and 5, the motor housing 28 contains a motor 30 whose shaft 32 extends downwardly through a suitable sealed opening at the bottom of the motor housing 28 and carries an impeller 34. The motor housing 28 additionally contains batteries 36 and 38, a sliding-plate switch generally indicated at 40 and having an upwardly extending switch lever 40a, and suitable electrical interconnections to connect the motor 30, the batteries 36 and 38 and the switch 40 such that the switch lever 40a, when moved all the way to the right in FIG. 4 connects the motor 30 to the batteries 36 and 38 (with the batteries being connected to each other in parallel) to thereby energize the motor 30 to rotate the impeller 34.

Referring back to FIGS. 1 and 2, a top lid 42 fits over the motor housing 28 and over the main body tube 24 and has a top opening 42a to allow manual access to the switch lever 40a. The fit is such that a dispersal slot 44 is left between the rim of the top lid 42 and the main body tube 24 for exit of the fluid flow which has gone up through the annular channel between the tube 24 and the motor housing 28, and through the dispersal ring 26. Referring to FIGS. 2, 4 and 5, the top lid 42 has a downwardly extending rim 42b which friction-fits tightly around a radially outwardly extending lip 28b of the motor housing 20 to seal the top opening of the motor housing. The motor housing 28 has a number of short ribs 28c which are below the lip 28b and extends radially outwardly such that when the motor housing 28 is fitted within the main body tube 24, the bottoms of these ribs 28c rest on the dispersal ring 26 and keep the top lid 42 spaced from the main body tube 24 sufficiently to form the dispersal slot 44.

In operation, a smoking article such as the cigarette 12 is placed on the ashtray 10, and the motor 30 is turned on by moving the switch lever 40a all the way to the right in FIG. 4 (or radially inwardly in FIG. 1) to start rotating the impeller 34. The flow caused by the impeller 34 is upward, and the smoke from the cigarette 12, as well as air entering through the cutouts 14a and 14b are drawn up through the ram tube 18 and through the ash screen 20 and the central opening 22b in the screen holder 22, as indicated by the arrows in FIGS. 4 and 5. The fluid flow is then forced up through the annular flow channel designated 44a and is forced up through the dispersal ring 26. The flow can not go straight up, however, but is turned around in the chamber defined by the sidewall of the motor housing 28, its radially outwardly extending ledge 28b and the rim 42b of the top lid 42, so that it exits primarily downwardly and perhaps radially outwardly through the dispersal slot 44.

The ash screen 20 serves two purposes: it collects ashes and similar particles to prevent them from being expelled into the ambient, and it breaks up and makes turbulent (or more so) the flow of smoke from the cigarette 12. Similarly, the impeller 34 serves the dual purpose of forcing the requisite fluid flow and further breaking up the smoke. The smoke is further broken up by being forced through the dispersal ring 26, whose aperatures are selected relative to the flow rate such that it makes the flow passing through it more turbulent. Perforations the size of which is at least about 0.5 mm are preferred. The flow is then made even more turbulent because it can not exit straight up but must be turned around to exit radially outwardly or downwardly through the dispersal slot 44. The smoke in this flow exiting from the dispersal slot 44 is so broken up and mixed up in a substantial airflow that it is invisible, or nearly so, and its smell is found by at least some people to be less objectionable than the smell of smoke directly issuing from a lit smoking article.

Because of the efficient arrangement defining the flow path within the device, and because of the relatively low resistence to flow of the ash screen 20, the power output of the motor 30 is relatively low and the drain of the parallel connected batteries 36 and 38 is correspondingly low, prolonging the useful life of the device. Because the motor chamber 28 is substantially sealed (at the bottom by a seal of the motor shaft 32 against the bottom wall of the housing 28 and at the top by the seal of the top lid 42), smoke and particles from the lighted smoking article tend to be kept away from the interior of the motor housing 28, thus preventing interference with the operation of the electrical components. Moreover, the device can be easily and conveniently taken apart for cleaning and then reassembled. In particular, the ashtray 10 is in relatively loose friction-fit within the accumulator tube 14 and can be easily removed from it, either by pulling it straight down or by slightly spreading the cutout 14a. The accumulator tube 14 is also in a friction-fit in the main body tube 24 and can be separated from the main body tube 24 by simply pulling, after which the screen holder 22 and the ash screen 20 can be easily lifted. By picking up the top lid 42, which is also in a friction-fit over the main body tube 24, the motor housing 28 (together with the impeller 34) is removed from the main body tube 24. All of the parts thus separated, except the motor housing 28, can be washed or otherwise cleaned. Since the motor housing 28 is sealed, there should be no need to clean its interior and its exterior can be cleaned without immersion in water. Batteries are changed by pulling the top lid 42 off the top of the motor housing 28. The device is reassembled with equal convenience by reversing the disassembly steps.

A second embodiment of the invented smoke dispersal device, illustrated in FIGS. 6-8, differs only in the following aspects: (a) the ash screen 20 and the screen holder 22 are omitted altogether; (b) the top 60 of the accumulator tube 14 has four open-top containers 62 for a chemical, such as Lysol, which can deodorize, and/or for some other chemical which can help remove some of the harmful or objectionable ingredients of smoke; (c) there is a valve ring 64 which has a central opening 61a registering with the opening 16 at the exit of the ram tab 14 and also has four openings 64b which can register with the containers 62; (d) the circular ridge made up of the three sequental projections 17 is replaced by a C-shaped ridge 66 having an opening 66a permitting an indicator tab 64c to fit in the opening 66a and to be manually movable to pivot the valve ring 64, which fits within the ridge 66 and directly over the top 60 of the accumulator tube 14, about the axis of that tube so as to completely close the containers 62 or to partially or fully open them; (e) an absorber 68, which may be a material similar to blotting paper and may be formed as a partial or a full cylinder, fits along the internal cylindrical wall of the main body tube and around the ridge 66; and (f) the absorber 66 has a notch 68a to accomodate the indicator tab 64c of the valve ring 64 and, similarly, the main body tube 24 has a notch 70 for the same purpose, there being marks 72 directly above the notch 70 to guide the user in selecting the position of the openings 64b of the valve ring 64 with respect to the containers 62.

Figure 6:
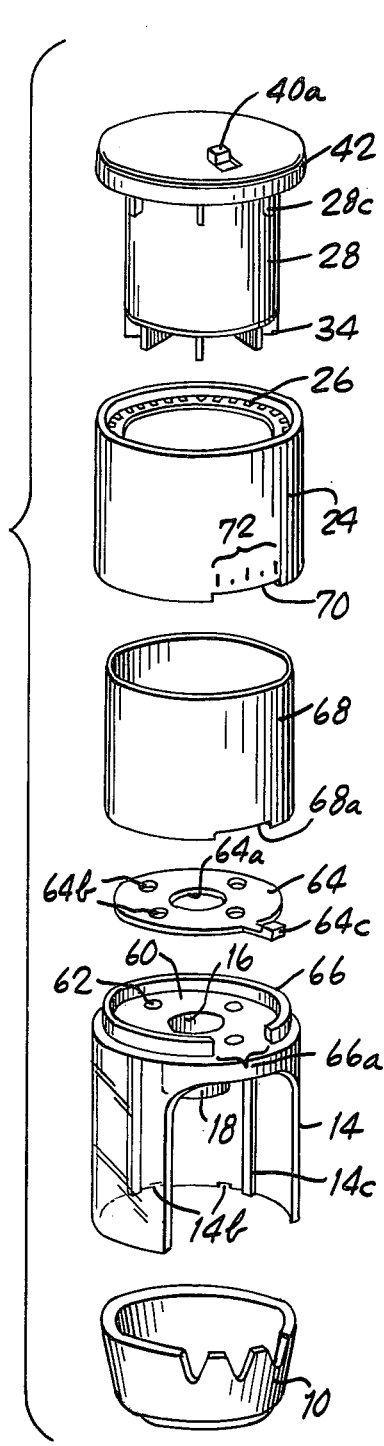
FIG. 6 is an exploded isometric view of another embodiment of the invented smoke dispersal device.
Figure 8:
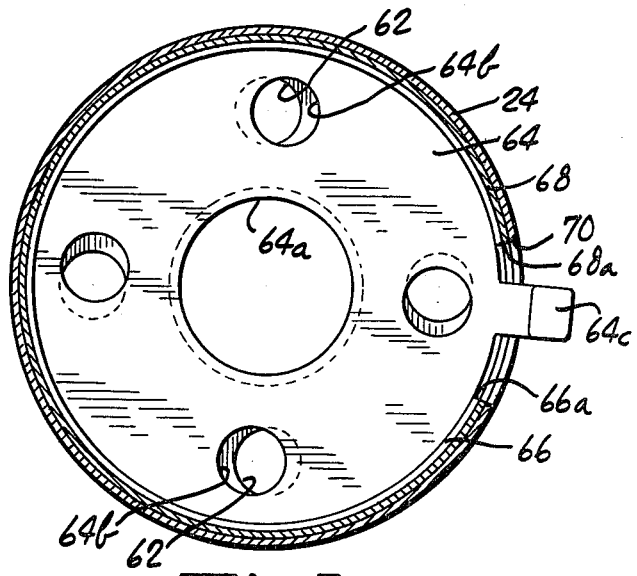
FIG. 8 is a sectional view taken at line 8—8 of FIG. 7.

The operation, assembly and disassembly of the embodiment illustrated in FIGS. 6-8 are the same as described in connection with FIGS. 1-5, except for the absence of the ash screen and screen holder, and except that a suitable chemical may be applied to the containers 62 and the absorber 68 to help remove some of the harmful or objectionable smoke ingredients and/or to help deodorize the air. The chemical for the containers 62 may be a common household deodorizer in liquid or in pellet form, and the chemical soaked into the absorber 68 may be a similar household deodorizer in liquid form.

The embodiment illustrated in FIGS. 6-8 is particularly advantageous for prolonging battery life while providing proper and satisfactory dispersal of the smoke and also providing a chemical cleaning and/or deodorizing action as well. Since the air flow does not go through the absorber 68 but only passes by it, the flow resistance is low and so is the battery drainage rate. The batteries are preferably operated connected to each other in a parallel circuit.

While the previously described sliding plate electrical switch may be used with either of the embodiments shown in FIGS. 1-5 on the one hand and FIGS. 6-8 on the other hand, either of the embodiments may be provided with the alternate electrical switch and battery mounting arrangement illustrated in FIGS. 10-13 which is particularly inexpensive to manufacture and easy to assemble and use. Referring to FIGS. 10-13, where the elements which have been previously discussed are identified by the same reference numerals, the alternate switch and battery mounting arrangement includes a negative terminal plate 80 made out of stamped sheet metal, a positive terminal plate 82 also made out of stamped sheet metal and a toggle 84 made of a nonconductive material and pivotally mounted on the negative terminal plate 80 by a pivoting rivet 86. A metal contact rivet 88 electrically contacts and secures one end of a wire 90 to the side of the toggle 84 which faces away from the plate 80. The other end of the same wire is connected to the negative terminal of the electric motor 30. The negative terminal plate 80 has an opening 80a (FIG. 12) which is larger than the contact rivet 88 such that when the toggle 84 is in the solid line position shown in FIG. 12 the contact rivet 88 and the wire 90 do not make electrical contact with the negative terminal plate 80 but when the toggle 84 is moved toward the dashed line position in FIG. 12 the contact rivet 88 starts sliding against the negative terminal plate 80 and makes electrical contact with it to close the circuit between the batteries 36 and 38 and the motor 30 and energize the motor. In order to securely maintain the toggle 84 in the off position, the plate 80 has a boss 81 which snaps into an opening 85 in the lower part of the toggle 84 when the toggle is in the dashed line position in FIG. 12. Some force must then be applied to the toggle 84 to move it toward its on position.

The negative terminal plate 80 has a cutout 80b which fits over a mounting rib 92 to secure the plate 80 in place, such that the lateral ends of the plate 80 rest against the inner wall of the motor housing 28. Similarly, the positive terminal plate 82 has a cutout 82a which fits over a mounting rib 94 to hold the plate 82 such that its lateral ends rest against the inner wall of the motor housing 28. For making proper electrical contact with the negative terminals of the batteries 36 and 38, the negative terminal plate 80 has a pair of stamp-formed tabs 80c and 80d bent to extend toward the positive terminal plate 82, and the positive terminal plate 82 has a pair of stamp-formed indentations 82c and 82d dimensioned to receive the projecting positive terminals of the batteries 36 and 38. One end of a wire 96 is electrically connected to the positive terminal plate 82, as by spot welding, and the other end of the same wire is connected to the positive terminal of the motor 30.

The switch and battery arrangement illustrated in FIGS. 9-13 is particularly inexpensive to manufacture and easy to assemble. The terminal plates 80 and 82 are sheet metal stampings and the rivets 86 and 88 are simple metal rivets. The toggle 84 is molded out of plastic material. The mounting ribs 92 and 94 can be molded integrally with a plate 98 which helps enclose and support the motor 30. In addition, the mounting ribs 92 and 94 have parts which extend between the batteries 36 and 38 and space them appropriately so that the batteries would be securely held against the inner wall of the motor compartment 28. Only two wires need be used, and only two wire ends need be secured to parts of the electrical switch and battery holding arrangement.

I claim:
1. A smoke dispersal device comprising:
an ashtray for receiving a smoking article;
a hollow accumulator tube having a bottom opening registering with the ashtray to receive smoke rising from a smoking article received thereby, a sidewall extending upwardly from the ashtray and having air inlet means, and a top opening;
a hollow main body tube supported by the accumulator tube and having a sidewall extending upwardly from the accumulator tube and having a bottom opening communicating with the hollow interior of the accumulator tube through the top opening of the accumulator tube;
a motor housing supported by the main body tube and disposed within the hollow interior of the main body tube and having a sidewall following the shape of the sidewall of the main body tube but spaced radially inwardly from the sidewall of the main body tube to form an annular flow channel communicating with the bottom opening of the main body tube, said motor housing having a bottom opening and a top opening and being substantially imperforated except for said bottom opening and said top opening;
a motor supported by and disposed within the motor housing and having a shaft extending through said bottom opening of the motor housing and substantially closing said bottom opening, and an impeller affixed to said shaft and disposed for rotation between the bottom of the motor housing and the accumulator tube to cause an upwardly directed flow of air entering the device through said inlet means of the accumulator tube and of smoke rising from said smoking article, and electrical batteries also dispose in and supported by said motor housing and means for selectively establishing an electrical connection between the batteries and the motor to energize the motor and to thereby cause said upward flow of air and smoke;
a top lid supported by the motor housing and disposed over the main body tube and the motor housing and over the motor and batteries in the motor housing and substantially closing the top opening of the motor housing, and means for spacing the top lid from the sidewall of the main body tube to form, between the top lid and the sidewall of the main body tube, a rim outlet communicating with said annular flow channel; and
a dispersal ring extending radially inwardly from the sidewall of the main body tube to the motor housing and having a plurality of perforations, said dispersal ring being interposed in said fluid flow in the annular flow channel and allowing fluid flow substantially only through said perforations, said perforations being selected relative to the rate of fluid flow caused by the impeller to make the flow downstream from the dispersal ring substantially more turbulent than the flow upstream therefrom;

whereby when the the device is supported with the ashtray registered with the bottom opening of the accumulator tube and the impeller is driven by said motor, an upwardly directed flow is generated which comprises air entering the device through said inlet means of the accumulator tube and smoke rising from said smoking article, said flow proceeding substantially unimpeded, except for becoming more turbulent, in a generally upward direction sequentially through thestop opening of the accumulator tube, the bottom opening of the main body tube, the annular channel between the main body tube and the motor housing, and the dispersal ring, and exiting the device through said rim outlet.

2. A smoke dispersal device as in claim 1 including an ash screen of low flow resistance interposed in said fluid flow path to be traversed by the flow.

3. A smoke dispersal device as in claim 2 including a ram tube having an upwardly extending axis and a diameter substantially less than that of the accumulator tube and having a top and a bottom opening, said ram tube being disposed to receive substantially all of the fluid flow proceeding upwardly from the interior of said accumulator tube and to convey said fluid flow into said main body tube.

4. A smoke dispersal device as in claim 3 wherein said ram tube extends from the top opening of the accumulator tube downwardly into the hollow interior of the accumulator tube and said ash screen is disposed between, on the one hand, the top opening of the ram tube and the accumulator tube and, on the other hand, the bottom opening of the main body tube, while said impeller is disposed between the ash screen and the motor housing.

5. A smoke dispersal device as in claim 4 including means for changing the direction of the flow downstream from the dispersal ring to cause said flow to exit through said rim outlet radially outwardly and downwardly along the device.

6. A smoke dispersal device as in claim 1 including an absorber lining one of the walls defining the circular flow channel betwen the motor housing and the main body tube, the upward flow passing by but not through said absorber, said absorber being capable of receiving a chemical such as a deodorizer.

7. A smoke dispersal device as in claims 1 or 6 including a plurality of containers for a chemical such as a deodorizer formed at the top of the accumulator tube immediately below the impeller.

8. A smoke dispersal device comprising:

an ashtray for receiving a smoking article;

a hollow accumulator tube having a bottom opening registering with the ashtray to receive smoke rising from a smoking article received thereby, a sidewall extending upwardly from the ashtray and having air inlet means, and a top opening;

a hollow main body tube supported by the accumulator tube and having a sidewall extending upwardly from the accumulator tube and having a bottom opening communicating with the hollow interior of the accumulator tube through the top opening of the accumulator tube;

a motor housing supported by the main body tube and disposed within the hollow interior of the main body tube and having a sidewall following the shape of the sidewall of the main body tube but spaced radially inwardly from the sidewall of the main body tube to form an annular flow channel communicating with the bottom opening of the main body tube, said motor housing having a bottom opening and a top opening and being substantially imperforated except for said bottom opening and said top opening;

a motor supported by and disposed within the motor housing and having a shaft extending through said bottom opening of the motor housing and substantially closing said bottom opening, and an impeller affixed to said shaft and disposed for rotation between the bottom of the motor housing and the accumulator tube to cause an upwardly directed flow of air entering the device through said inlet means of the accumulator tube and of smoke rising from said smoking article, and electrical batteries also disposed in and supported by said motor housing and means for selectively extablishing an electrical connection between the batteries and the motor to energize the motor and to thereby cause said upward flow of air and smoke;

a top lid substantially closing the top opening of the motor housing, and means for spacing the top lid form the sidewall of the main body tube, a rim outlet communicating with said annular flow channel; and a dispersal ring extending radially inwardly from the sidewall of the main body tube to the motor housing and having a plurality of performations, said dispersal ring being interposed in said fluid flow in the annular flow channel and allowing fluid flow substantially only through said perforations, said perforations being selected relative to the rate of fluid flow caused by the impeller to make the flow downstream from the dispersal ring substantially more turbulent than the flow upstream therefrom;

whereby when the device is supported with the ashtray registered with the bottom opening of the accumulator tube and the impeller is driven by said motor, an upwardly directed flow is generated which comprises air entering the device through said inlet means of accumulator tube and smoke rising from said smoking article, said flow proceeding substantially unimpeded, except for becoming more turbulent, in a generally upward direction sequentially through the top opening of the accumulator tube, the bottom opening of the main body tube, the annular channel between the main body tube and the motor housing, and the dispersal ring, and exiting device through said rim outlet; and said flow in proceeding through the device passing only through openings and preparations each exceeding 0.5 mm in size.

9. A smoke dispersal device as in claim 8 including an absorber along the side of the main body tube which faces the annular flow channel, said upward flow passing by but not through said absorber, and said absorber being capable of retaining a chemical affecting the make-up of the flow passing by it.

10. A smoke dispersal device as in claims 8 or 9 including a plurality of open top containers located at the top of the accumulator tube and surrounding the top opening of the accumulator tube, said containers being capable of retaining a chemical affecting the make-up of the flow passing by the containers.

11. A smoke dispersal device as in claim 10 including a valve ring having openings registerable with the open tops of said containers movable manually to selectively close said open tops of the containers to a desired degree.

12. A smoke dispersal device as in claim 8 or 9;
a first terminal plate and a second terminal plate located in the motor housing above the motor and spaced from each other to receive between them batteries having one terminal at one extreme end and another terminal and the other extreme end, said terminal plates having means for making electrical contact with batteries and being made of an electrically conductive material, and a toggle pivotally mounted on the first terminal plate and having a contact offset from the pivot axis and making sliding electrical contact with the first terminal plate through a portion of pivotal movement of the toggle, said first terminal plate having an opening aligned with the path of the contact and larger than the contact, said first plate and said sliding contact being out of electrical contact with each other when the sliding contact is centered in the opening, said toggle being made of an electrically nonconductive material and said contact thereof being electrically connected to the motor and the second terminal plate being also electrically connected to the motor.

* * * * *